Oct. 24, 1967  D. S. THAYER  3,349,070
BULK POLYMERIZATION PROCESS
Filed April 22, 1963
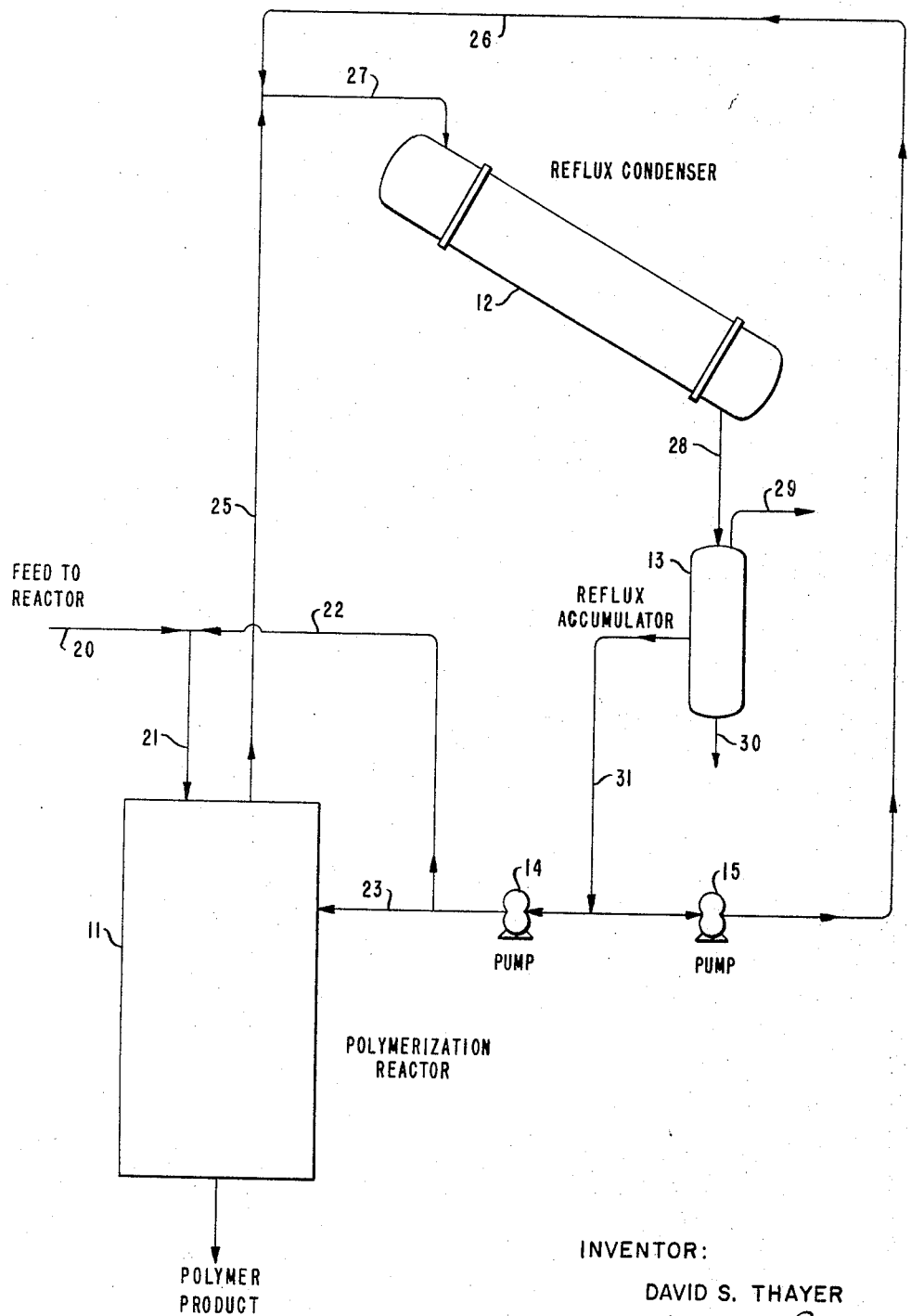
INVENTOR:
DAVID S. THAYER
BY: *Martin P. Baer*
HIS ATTORNEY

United States Patent Office 3,349,070
Patented Oct. 24, 1967

3,349,070
BULK POLYMERIZATION PROCESS
David S. Thayer, Hillsdale, N.J., assignor to Shell Oil Company, New York, N.Y., a corporation of Delaware
Filed Apr. 22, 1963, Ser. No. 274,576
3 Claims. (Cl. 260—93.5)

This invention relates to an improved method of bulk polymerization. The method is particularly useful for bulk polymerization of mono-vinyl aromatic compounds, such as styrene.

Bulk polymerization, also known as mass polymerization, is a well-known method for carrying out the polymerization of monomers and mixtures of monomers. In bulk polymerization, the reaction mass consists substantially entirely of one or more polymerizable compounds which polymerize under controlled conditions without addition of polymerization catalysts, or with relatively small amounts of polymerization catalsyt, and in the substantially complete absence of inert solvents. Bulk polymerization of styrene is described for example in the book "Styrene, Its Polymers, Copolymers and Derivatives" by Boundy and Boyer, Reinhold Publishing Corp., New York, 1952.

The present invention applies to the bulk polymerization of styrene and vinylidene compounds similar to styrene and to mixtures of a major proportion of styrene and a minor proportion of other polymerizable ingredients. It will be understood that when polymerization of feeds "consisting essentially of" the named monomer, e.g., styrene, is referred to, this includes polymerization of feeds containing small amounts of other components.

Bulk polymerization may be carried out in batch-wise or continuous processing and in various types of equipment. Kettles provided with heat-exchange surface and agitators have been used, as have columns in which the reaction mass passes in one direction through a wide tubular reaction zone which may be equipped with internal or external heat exchange surfaces and with stirring equipment and which may be arranged such that the temperatures of the heat exchange media in several successive zones may be separately controlled. All such apparatus can be used in this invention.

One of the most difficult problems in successful bulk polymerization of monomers such as styrene is satisfactory control of temperature in the reaction mixture and removal of the very substantial amount of heat liberated in the polymerization process. Heat removal by indirect heat exchange is not a serious problem in the initial stages of polymerization while the reaction mixture is quite fluid. As the concentration of polymer in the reaction mixture increases during the course of the reaction, the mixture becomes progressively more viscous. One of the methods for controlling heat during the latter stages of the polymerization is by evaporative cooling, which consists in permitting part of the monomer or mixture of monomers to evaporate from the liquid surface of the reaction zone and removing the vapor stream. Evaporative cooling in bulk polymerization is described, for example, in U.S. 2,122,805 to Wulff et al. According to that patent, it is generally desirable to carry out the polymerization of styrene and the like at temperatures substantially below the atmospheric boiling point of the monomer. The patentees solved this by carrying out the polymerization under vacuum. One of the characteristics of their process is the fact that the viscosity of the reaction mixture is increased as vapor is removed. This aggravates the problem of heat control by indirect heat exchange in viscous reaction mixtures, and of product flow in equipment for the continuous production of polymers.

This invention is an improvement of the process for the bulk polymerization of styrene or the like in which the polymerization mass is at least at its atmospheric boiling temperature and monomer vapor is withdrawn from the surface to provide evaporative cooling at or near the boiling point of the monomer. While it has been found that this is a very successful method for carrying out the polymerization of styrene and mixture consisting essentially of styrene, it has also been found that it is essential for successful commercial operation of the process to condense the withdrawn monomer and return the condensate to the polymerization reactor. The major amount of heat removal is obtained by the vaporization of monomer from the surface of the reaction mass; some additional cooling is obtained by returning the cooled condensate. It has been found that a particular disadvantage of this method of operation arises due to the fact that the dew point of styrene (293° F.) is high enough so that appreciable polymerization can occur in the liquid phase during the residence time of styrene passing through the condenser. The polymer formed in this manner adheres to the process surfaces of the condenser, thereby reducing the heat transfer ability of the exchanger. This increases the period of time during which monomer is maintained at the elevated temperature in the condenser and increases the rate of polymerization, resulting in fouling and ultimate plugging of the equipment.

The problem of condenser plugging is particularly aggravated when the polymerization mixture is one of styrene and more highly reactive monomers such as methylmethacrylate or acrylonitrile. Small fractions of these monomers react very rapidly at the relatively high dew points encountered where styrene is the major component. In such systems it has been found that at times condenser plugging occurred within intervals as short as two days.

The principal object of this invention is to provide an improvement in the evaporatively cooled bulk polymerization of monomers such as styrene wherein monomer vapor is condensed and recycled to the polymerization mass, the improvement being directed to preventing polymerization in the condenser and frequent plugging of the condenser.

This and other objects of this invention, which will appear from the description thereof, are accomplished by recirculating a stream of cold monomer from the reflux accumulator to the inlet of the condenser, as further illustrated below. A sufficient volume of the cold liquid is provided to reduce the temperature of the combined liquid and vapor streams entering the condenser below the point where solid polymer can form during the residence time in the condenser. The modified process according to this invention has the further advantages of reducing the residence time of the contents of the condenser by increasing the volume passing therethrough, and of scouring the condenser surfaces due to increased liquid velocity.

A specific embodiment of this invention will be described with reference to the accompanying drawing, which is a schematic representation of a suitable apparatus. For purposes of illustration this description is made with reference to the polymerization of styrene.

The illustrated equipment consists of a polymerization reactor 11, reflux condenser 12, reflux accumulator 13, pumps 14 and 15, and associated piping. The usual auxiliary equipment, such as valving and instrumentation, is not shown. The polymerization reactor may be a kettle or tower reactor of any known or suitable type and may contain associated equipment as is well known in the art, e.g., internal dividers, stirring devices, indirect heating and cooling surfaces, and the like. The reflux condenser is suitably a conventional tubular condenser and may be placed with its axis at an angle from the horizontal as illustrated, although not necessarily so. The reflux accumulator may be a simple drum.

In the operation of the process, feed is passed to the reactor via lines 20 and 21. The feed may consist entirely of monomer, such as styrene, or may be a partially polymerized reaction mixture consisting of styrene and polystyrene, obtained from a prepolymerizer vessel. The feed from line 20 is suitably combined with styrene reflux from line 22.

While polymerization is in progress, a vapor stream consisting largely or entirely of styrene monomer is withdrawn from the reactor via line 25, combined with cold reflux from line 26 and passed into reflux condenser 12 via line 27. Effluent from the reflux condenser is passed via line 28 to reflux accumulator 13, from which any noncondensable gases may be removed via line 29, aqueous phase via line 30, and the hydrocarbon condensate phase via line 31. Part of the condensate is recycled by pump 15 via line 26 for admixture with the vapor stream and part is returned by pump 14, either via line 22 for recombination with feed to the reactor or via line 23 for separate return to the reactor.

The liquid streams of feed and reflux passing into the reactor via lines 21 and 23 may be distributed over the boiling surface of the polymerization mixture or may be introduced below the surface but quite close thereto.

The effective operation of this invention is not dependent on the manner in which the polymerization reaction itself is carried out, except that the invention applies only in those cases where a vapor stream consisting essentially of monomer or a mixture of monomers is withdrawn from the reactor at a sufficiently high temperature and monomer concentration so that polymerization in the reflux condenser is sufficiently rapid to induce fouling of the condenser surfaces. The process of this invention is beneficial in the homopolymerization of styrene when the temperature of the vapor stream is at least about 280° F., and particularly when it is at least about 294.8° F., the atmospheric boiling point of styrene.

Typically the temperature of the vapor stream from styrene homopolymerization is in the range from 280° to 375° F. This vapor stream is combined according to this invention, with sufficient cold liquid reflux, typically at a temperature of about 65° F., to produce a mixture of liquid and vapor which is at a temperature of less than 200° F. and preferably below 150° F. before it enters the reflux condenser. For any given vapor stream and liquid stream temperature, the amount of cold reflux liquid required to provide a vapor-liquid mixture of less than a particular desired temperature, e.g., 150° F., is determined by a simple heat balance calculation, taking into account both the sensible heat of the liquid and vapor streams, the heat of vaporization of the components of the liquid stream, and the heat of condensation of the components of the vapor stream.

While the polymerization in the reaction zone is generally carried out at about atmospheric pressure, elevated pressures may also be employed. Suitable pressures are in the range between 0 and 50 p.s.i.g. If desired, a small amount of water may be maintained in the boiling portion of the polymerization zone and carried along with the overhead vapors.

The description of this invention has been in terms of polystyrene manufacture because of the importance of this polymer type and because it permits a clear description of the advantages of the invention. The polymerization of other polymerizable vinyl aromatic compounds which are highly reactive at a temperature near their boiling point can be equally benefited according to this invention. This includes compounds such as vinyl xylenes, which boil between about 374 and 392° F.; vinyl ethyl benzenes, which boil around 374° F.; vinyl toluenes, which boil about 338° F.; and other polymerizable compounds such as ethyl acrylate and methylmethacrylate, which boil around 212° F. The invention is particularly applicable to the polymerization of monomer mixtures comprising a major proportion of styrene, generally at least 60–75% styrene, and a minor proportion, typically less than 25%, of an olefinically unsaturated comonomer such as ethylacrylate, methylmethacrylate, acrylonitrile, methylstyrene and others.

The polymerization may be carried out in the presence of small amounts of compounds which are known to the art to be useful in such polymerizations, including small amounts of polymerization catalysts such as benzoyl peroxide, lauroyl peroxide, or ditertiary butyl peroxide, low concentrations of lubricants or flow agents such as mineral oil in the 100–500 SSU viscosity range, paraffin wax, butyl stearate, or soybean oil, typically in concentrations up to about 10% by weight; polymerization modifiers such as lauroyl mercaptan, diisopropyl xanthate and methallyl phosphate; oxidation stabilizers and light stabilizers such as 2,6-ditert-butyl-4-methylphenol, 2-alkyl-1,2,3-benzyl triazol and the like; color masking agents, such as a small amount of blue dye; and other known additives. In general these additives do not vaporize to a significant extent from the reaction mixture and hence do not affect the operation of this invention.

This invention is suitable in the polymerization of mixtures of styrene with from 1–15% or more by weight of an unvulcanized elastomer for the purpose of producing high-impact polystyrene, such as described in some detail, for example, in U.S. 2,694,692 to Amos et al.

As has been stated, the invention may be applied in systems in which monomer is polymerized in a single reaction stage or in multiple reaction stages. In a particularly preferred system, prepolymerization is carried out in a first reactor which may be indirectly cooled. The prepolymerized mixture, which may contain from 5 to 40% of polymer, is then passed to a second reactor which may suitably be a tower reactor in which direct cooling by vaporization of monomer takes place in the top of the tower. The invention is then applied to the vapor stream taken from the top of the tower.

The invention will be further described by means of the following example. The example is merely illustrative and is not intended to limit the scope of the invention.

*Example*

Polymerization of styrene or feed consisting essentially of styrene is carried out in a system consisting of a stirred kettle prepolymerizer and a tower reactor. The prepolymerizer is operated with a temperature in the range of 195° to 300° F. for a sufficient time to result in conversion of 15 to 30% of monomer to polymer. The reaction mixture is then transferred to a tower in which most of the polymerization takes place at or near the top surface of the charge at a temperature of about the boiling point of the top layer of the charge. Part of the heat of the reaction is removed from this tower by allowing monomer to vaporize. The vapor is condensed and the condensate returned to the reaction mass. The remaining heat of reaction raises the temperature of the reaction mass. The product moves slowly down the tower generally at increasingly higher temperatures; indirect heating of the tower contents may be utilized after removal from the tower, the product is devolatilized to remove residual monomer, extruded, and pelletized.

In a typical operation according to this manner, a stream consisting of 65% w. styrene and 35% w. of lower boiling, reactive monomer is removed from the top of the tower and passed to the reflux condenser. To 100 parts by weight of this stream, at a temperature of 300° F., there are added 115 parts by weight of cold liquid reflux, having substantially the same composition, at a temperature of 65° F. The resulting vapor liquid mixture, at a temperature of 150° F., is thereafter passed through the condenser and to the accumulator, as illustrated in the drawing.

In a continuous operation carried out in this manner in which a mixture of a highly reactive, relatively low boiling monomer, styrene and rubber was polymerized in a prepolymerization stage and the total mixture was further copolymerized in a tower reactor, it was found that the reflux condenser fouled to an objectionable extent at intervals ranging from two to seven days when the process of this invention was not applied. By applying the process of this invention, a similar degree of fouling was delayed by 30 to 40 days or more.

The benefits of this invention are equally obtained by substituting as feed for the styrene of the above example various other feed mixtures, such as those consisting essentially of a mixture of vinyl toluene isomers, predominantly the ortho- and meta-isomer, or mixtures of styrene containing small amounts of methylmethacrylate, ethyl acrylate or the like.

I claim as my invention:

1. In the bulk polymerization of a feed consisting essentially of styrene in a reaction system comprising a polymerization zone in which the reaction mixture is cooled by evaporative cooling and from which a vapor stream consisting essentially of styrene is withdrawn at a temperature of at least about 280° F., the steps of combining said vapor stream with a liquid condensate having the some composition as said vapor stream, in sufficient amount to provide a liquid-vapor mixture having a temperature below 200° F., passing said liquid-vapor mixture through a condenser wherein the monomer vapors are condensed, returning part of the resulting condensate as said liquid condensate to admixture with said vapor stream, and returning the remainder of the condensate to the reaction mixture.

2. In the bulk polymerization of a feed consisting of at least a major proportion of a vinyl aromatic compound and at most a minor proportion of an olefinically unsaturated comonomer, in a reaction system comprising a polymerization zone in which the reaction mixture is cooled by evaporative cooling and from which a vapor stream consisting essentially of reactive monomers is withdrawn at a temperature of at least about 280° F., the steps of combining said vapor stream with a liquid condensate having the same composition as said vapor stream, in sufficient amount to provide a liquid-vapor mixture having a temperature below 200° F., passing said liquid-vapor mixture through a condenser wherein the monomer vapors are condensed, returning part of the resulting condenate as said liquid condensate to admixture with said vapor stream, and returning the remainder of the condensate to the reaction mixture.

3. The process according to claim 1 wherein said vapor stream is at a temperature of at least 294.8% F., said liquid condensate is at a temperature of the order of 65° F. and said liquid-vapor mixture has a temperature no higher than 150° F.

References Cited

UNITED STATES PATENTS

| | | | |
|---|---|---|---|
| 2,224,986 | 12/1940 | Potts et al. | 203—87 |
| 2,714,101 | 7/1955 | Amos et al. | 260—93.5 |
| 2,930,786 | 3/1960 | Cottle et al. | 260—93.5 |
| 2,931,793 | 4/1960 | Melchore | 260—93.5 |
| 2,989,517 | 6/1961 | Hanson et al. | 260—93.5 |
| 3,182,050 | 5/1965 | Irwin | 260—93.5 |

JOSEPH L. SCHOFER, *Primary Examiner.*

JAMES A. SEIDLECK, *Assistant Examiner.*